Jan. 30, 1962  A. C. SAMPIETRO  3,019,029
AUTOMOBILE WHEEL SUSPENSION SYSTEMS
Filed Dec. 18, 1957  3 Sheets-Sheet 2
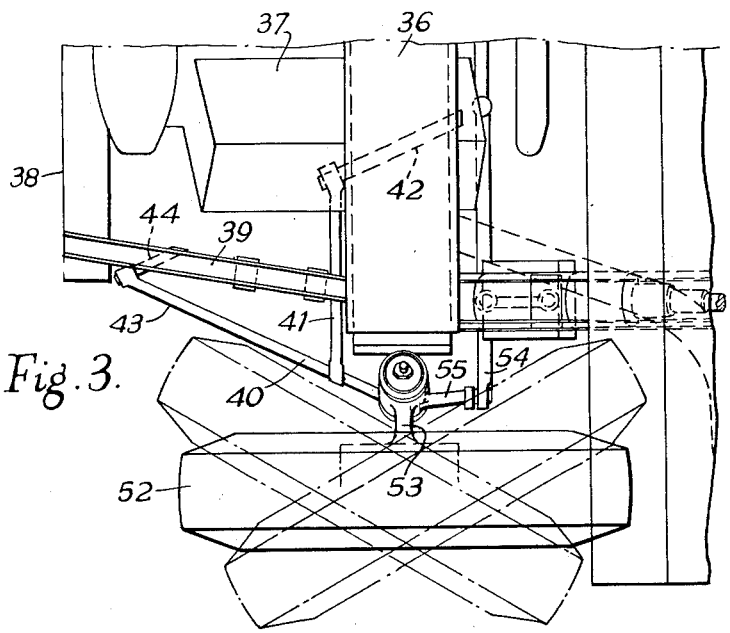
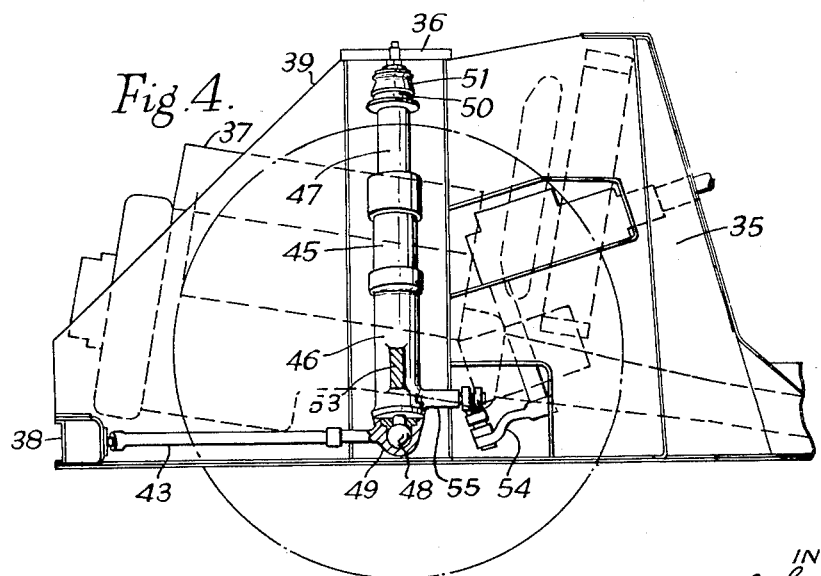
INVENTOR
Achille C. Sampietro
BY
Ralph B. Stewart
ATTORNEY

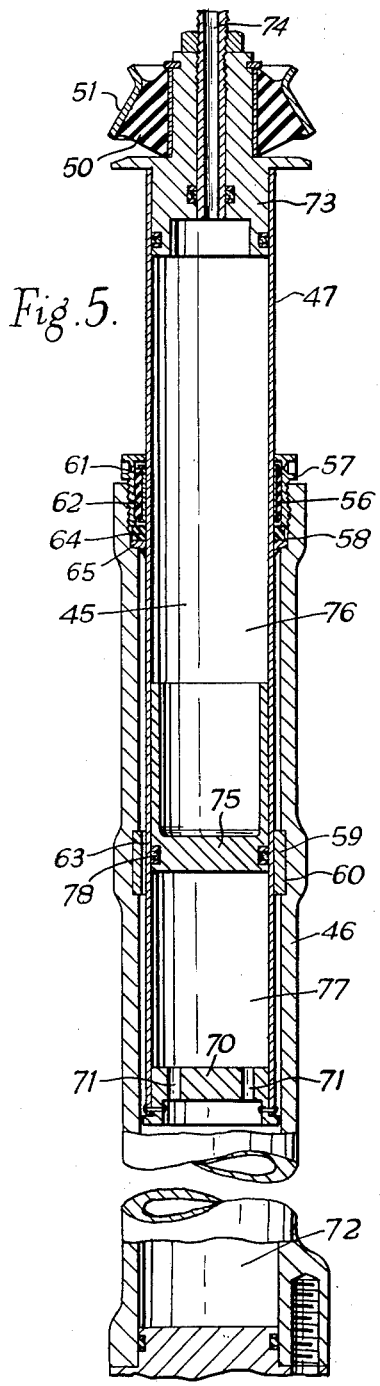
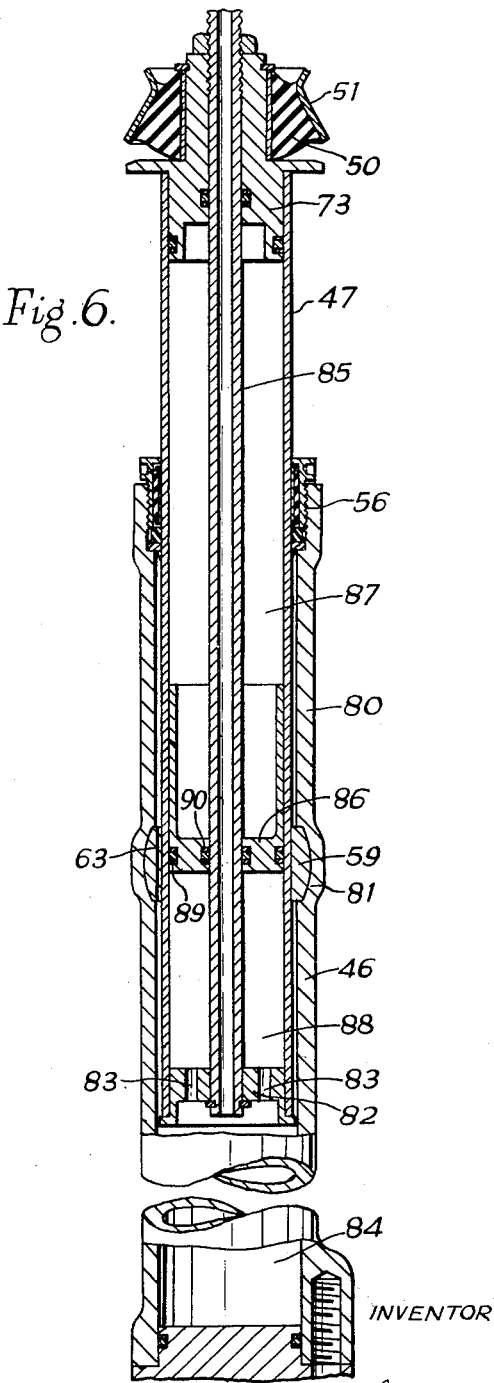

United States Patent Office 3,019,029
Patented Jan. 30, 1962

3,019,029
AUTOMOBILE WHEEL SUSPENSION SYSTEMS
Achille Carlos Sampietro, 286 Puritan,
Birmingham, Mich.
Filed Dec. 18, 1957, Ser. No. 703,628
Claims priority, application Great Britain Dec. 21, 1956
8 Claims. (Cl. 280—124)

This invention relates to suspension systems for the front wheels of automobile vehicles, the system being of the type wherein each wheel has an associated swing axle, that is an axle pivotally mounted on the frame of the vehicle.

In conventional suspension systems of the above-mentioned type each of the front wheels is mounted on a stub axle that is connected to the associated swing axle by means of a swivel pin which permits pivotal movement of the stub axle and wheel for steering the vehicle. The ends of the swivel pin are either mounted in a forked end of the stub axle with the centre portion of the swivel pin mounted in the swing axle, or alternatively the ends of the swivel pin are mounted in a forked end of the swing axle with the centre portion of the swivel pin mounted in the stub axle. The swivel pin is fixed to the stub axle and is free to turn in a bearing in the swing axle, or alternatively the swivel pin is fixed to the swing axle and is free to turn in a bearing in the stub axle.

The springs and the shock absorbers of such conventional suspension systems are additional fittings which are connected between the swing axle and the frame of the vehicle, and an object of the invention is to provide a simplification in this respect.

A further object of the invention is to provide an improved construction of telescopic spring unit for use in a suspension system for a front wheel of a vehicle.

Figure 1:
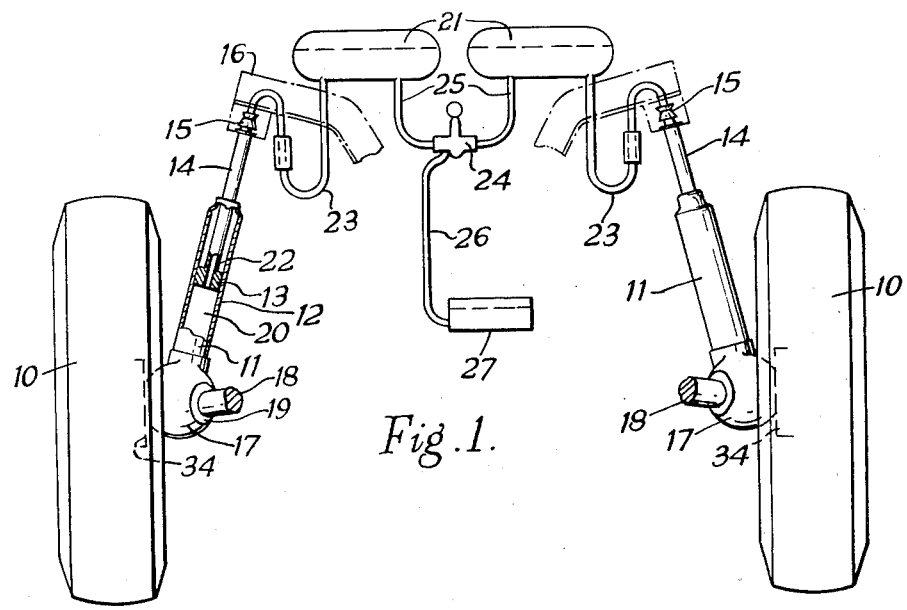
Figure 2:
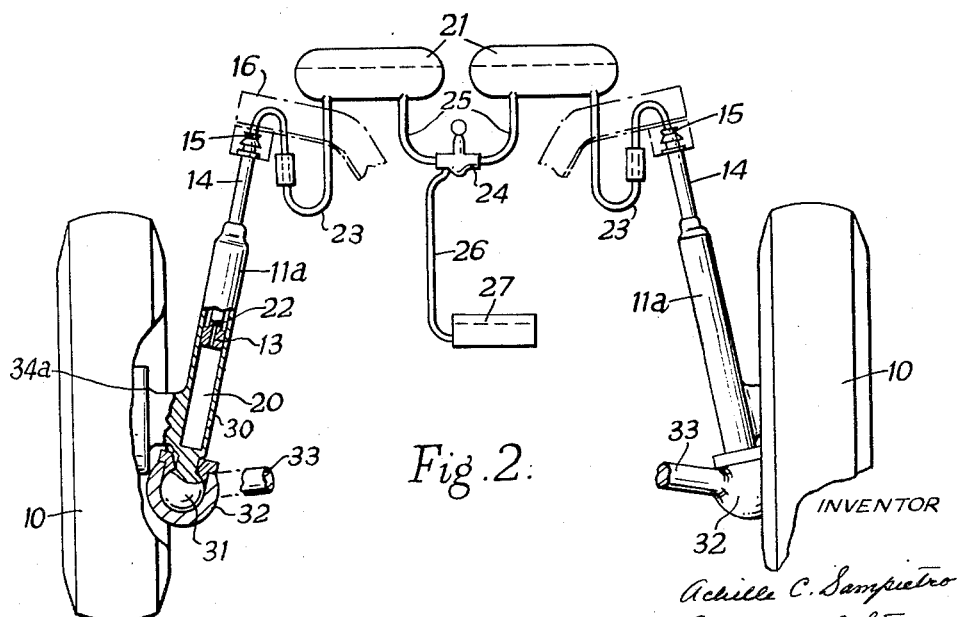

The invention will now be described with reference to the accompanying drawings, in which:

FIG. 1 shows telescopic units and associated fluid circuits of suspension systems according to the invention, for the two front wheels of an automobile vehicle, FIG. 2 shows a modification of the arrangement of FIG. 1, FIG. 3 is a plan view of a front wheel suspension system according to the invention, showing the mounting of the system on the frame of an automobile vehicle, FIG. 4 is a view, in elevation, of the suspension system of FIG. 3, with the wheel and stub axle removed for clearness, FIG. 5 is a view, in longitudinal section, of one form of a telescopic spring unit suitable for use in the suspension system of FIGS. 3 and 4, FIG. 6 is a view, in longitudinal section, of another form of telescopic spring unit suitable for use in the suspension system of FIGS. 3 and 4.

Referring to FIG. 1, each front wheel 10 is mounted upon a telescopic unit 11 which comprises a cylinder 12 inclined downwards and outwards at a small angle to the medial plane of the vehicle, a piston 13 within the cylinder 12, and a piston rod 14 projecting out of the upper end of the cylinder 12. The upper end of the piston rod 14 is mounted in a rubber block 15 which is secured to the frame 16 of the vehicle, the resilience of the rubber block 15 permitting limited pivotal movement of the piston rod 14 relative to the vehicle frame 16. A socket member 17 is rigidly secured to the lower end of the cylinder 12, and the associated wheel 10 is rotatably mounted on a stub axle 34 which is secured to and extends laterally outwards from the socket member 17. Each telescopic unit 11 is connected to a swing axle 18 (only the outer end of each swing axle 18 being shown in FIG. 1). Each swing axle 18 is pivotally mounted on the frame 16, and is provided at its outer end with a ball 19 which fits within the associated socket member 17, the ball and socket joint 19, 17 permitting pivotal movement of the cylinder 12 relative to the swing axle 18 and also permitting angular movement of the cylinder 12 about its own axis.

The lower end of each cylinder 12 is sealed and the space enclosed by each piston 13 and the lower end portion of its cylinder 12 forms a chamber 20, the volume of which increases and decreases upon telescopic extension and contraction respectively of the spring unit comprising the cylinder 12 and the piston rod 14. Each telescopic unit 11 is provided with a pressure vessel 21 which is in communication with the respective chamber 20 through an axial duct 22 extending through the entire length of the piston 13 and the piston rod 14 and a flexible pipe 23 connected between the upper end of the piston rod 14 and the bottom of the associated pressure vessel 21. The chambers 20, the axial ducts 22 and the flexible pipes 23 for the two telescopic units 11 are filled with liquid e.g. oil, and the two pressure vessels 21 are normally rather more than half full of liquid. The space in each pressure vessel 21 above the liquid level contains air under pressure, and the cylinder space above each piston 13 communicates with the atmosphere via ports (not shown) in the upper ends of the cylinders 12.

The static height of the vehicle is adjustable by a valve 24 which controls the quantity of liquid in the vessels 21 and chambers 20, and thereby regulates the length of the telescopic units 11 under a given loading. The valve 24 is connected by pipes 25 to each of the pressure vessels 21, and the valve 24 is adjustable to three positions.

In its first position the valve 24 isolates the pipes 25 from one another so that each pressure vessel 21 forms a separate cushion for the liquid in its associated telescopic unit 11, and the two units 11 are biased into their extended positions by the pressure of oil in the chambers 20. Upon increase in the loading on a telescopic unit, the piston 13 is forced downwards and liquid from the chamber 20 is forced through the duct 22 and pipe 23 into the associated pressure vessel 21, the air in the pressure vessel being compressed until the loading on the piston 13 due to the oil pressure in the chamber 20 equals the loading on the telescopic unit.

In its second position of adjustment the valve 24 connects the pipes 25 to a pipe 26 leading to a high pressure liquid reservoir 27, whereupon liquid from the reservoir 27, which is at a higher pressure than the liquid in the pressure vessels 21, is forced into the vessels 21, and liquid from the vessels 21 is then forced into the chambers 20, thereby extending the telescopic units 11. In addition, since both pipes 25 are connected to pipe 26 the pressure in the two vessels 21 is equalized.

In its third position of adjustment, the valve 24 connects the pipes 25 to a low pressure tank (not shown) and bleeds liquid from the vessels 21. Liquid from the chambers 20 is then forced into the vessels 21 due to the loading of the wheels 10, thereby contracting the telescopic units 11.

Since the wheels 10 are mounted on the stub axle 34 secured to the cylinders 12 of the telescopic units, the vehicle is steered by angular adjustment of the cylinders 12 about the pistons 13, the ball and socket joints 19, 17, permitting angular movement of the cylinders 12 relative to the swing axles 18. The pistons 13 and the piston rods 14 thus serve as swivel pins for the wheels 10, as well as being elements of the spring suspensions for the wheels.

The suspension system shown in FIG. 2 is a modification of the system of FIG. 1 and like reference numerals denote like parts in these two figures. Referring to FIG. 2, each wheel 10 is mounted on a telescopic unit 11a having a piston 13 and a piston rod 14 mounted in a rubber block 15 which is secured to the frame 16 of the vehicle. An axial duct 22 in the piston rod communicates via a flexible pipe 23 with a pressure vessel 21, and a valve 24 controls the quantity of fluid in the vessels 21 and chambers 20, all as previously described with reference to FIG. 1.

The piston 13 of each telescopic unit 11a is mounted in a cylinder 30, the lower end of which is provided with a ball 31 which fits within a socket 32 on the free end of a swing axle 33. A stub axle 34a carrying the associated wheel 10 is integral with and extends laterally outwards from the cylinder 30, and the vehicle is steered by angular adjustment of the cylinders 30 about the pistons 13.

In FIGS. 3 and 4 only the portion of the frame of the vehicle necessary to illustrate the mountings for the suspension system of the wheel is illustrated, but the construction of the frame is preferably as shown and described in my co-pending patent application Serial No. 701,583, filed December 9, 1957, now Patent No. 2,963,106.

Referring to FIGS. 3 and 4, the frame of the vehicle comprises a central platform having a double skinned front dash 35, a rectangular yoke piece 36 surrounding and supporting an engine 37, and a front cross member 38, the yoke piece 36 and the cross member 38 being mounted on double skinned side walls 39 (only one of which is shown) extending forwardly from the dash 35.

A swing axle 40 comprises an arm 41 rigidly secured to a spindle 42 which is mounted in a bearing secured to the lower cross member of the yoke piece 36, and a further arm 43 rigidly secured to a spindle 44 which is mounted in a bearing in the side wall 39. The spindles 42, 44 are arranged on a common axis extending rearwardly and inwardly towards the centre line of the vehicle, and the arm 41 extends laterally outwards and is secured to an intermediate portion of the arm 43 which extends rearwardly and outwardly.

A telescopic spring unit 45 comprises a hollow outer cylindrical member 46 and a hollow inner cylindrical member 47. The lower end of the cylindrical member 46 is sealed and formed with a ball 48 which fits within a socket 49 on the rear end of the arm 43 of the swing axle 40, and the upper end of the cylindrical member 47 is mounted in a rubber block 50 secured by a bracket 51 to the yoke piece 36. A wheel 52 is mounted on a stub axle 53 formed integral with the outer cylindrical member 46 of the telescopic spring unit 45, and the wheel is steered by steering linkage 54 connected to an arm 55 extending rearwardly from the cylindrical member 46, the ball and socket joint 48, 49 permitting angular movement of the outer cylindrical member 46 about the inner cylindrical member 47.

Referring to FIG. 5 the cylindrical member 47 is slidably mounted in an outer bearing 56 located in a collar 57 screwed into a recess 58 in the upper end of the cylindrical member 46, and in an inner bearing 59 located in a recess 60 in the inside surface of the cylindrical member 46 intermediate its ends. The outer bearing 56 comprises a Teflon self-lubricating liner 61 having a rubber backing 62 supported on the inside surface of the collar 57. The inner bearing 59 is in the form of two semi-circular shells to facilitate assembly of the bearing in the recess 60, and the shells are provided with small channels 63 to permit passage of oil for lubrication. A rubber ring 64 and a seal 65 clamped in the lower end of the recess 58 by the collar 57 prevent escape of oil upwards past the bearing 56.

The lower end of the cylindrical member 47 is closed by a disc 70 having small metering orifices 71 and the space enclosed between the disc 70 and the lower end portion of the cylindrical member 46 forms an outer oil chamber 72. The upper end of the cylindrical member 47 is closed by a plug 73 having a tube 74 extending axially therethrough and the compartment formed between the plug 73 and the disc 70 is subdivided by a piston 75 into an air chamber 76 between the piston 75 and the plug 73 and an inner oil chamber 77 between the piston 75 and the disc 70. The piston 75 is an easy sliding fit within the cylindrical member 47 and sealing rings 78 in the wall of the piston prevent escape of oil from the inner oil chamber 77 into the air chamber 76.

In operation, the chambers 72 and 77 are filled with liquid, e.g. oil and the chamber 76 is supplied through the tube 74 with gas, e.g. air, under pressure, the tube 74 then being sealed by a valve (not shown). Upon increase in the loading on the telescopic unit, the cylindrical member 47 is forced downwards, thereby reducing the volume of the chamber 72, and oil from the chamber 72 is forced through the orifices 71 into the chamber 77. The influx of oil into the chamber 77 forces the piston 75 upwards and increases the pressure of the air in the chamber 76 until the loading on the piston 75, due to the air pressure in the chamber 76, equals the loading on the telescopic unit. The rate of flow of oil between the chambers 72 and 77 is restricted by the metering orifices 71, thereby dampening oscillatory movement of the cylindrical member 46.

The overall length of the telescopic unit 45 under a given loading, and hence the static height of the frame of the vehicle above the ground, may be adjusted by regulating the quantity of air in the chamber 76, the air being supplied to or bled from the chamber 76 through the tube 74 in the plug 73.

FIG. 6 shows a telescopic unit 80 which is a modification of the telescopic unit 45 of FIG. 5, and like reference numerals denote like parts in these two figures.

Referring to FIG. 6, the telescopic unit 80 comprises a hollow inner cylindrical member 47, the upper end of which is closed by a plug 73 mounted in a rubber block 50 secured by a bracket 51 to the frame of the vehicle, and a hollow outer cylindrical member 46 slidably mounted by bearings 56, 59 on the cylindrical member 47, all as previously described with reference to FIG. 5. The bearing 59 may however as shown in FIG. 6, be provided with a part-spherical outer surface engaging in a recess 81 in the inside wall of the member 46, the recess 81 having a surface complementary to the outside surface of the bearing 59 in order to provide the bearing with self-aligning properties.

The lower end of the cylindrical member 47 is closed by a disc 82 having small metering orifices 83, and the space enclosed between the disc 82 and the lower end portion of the cylindrical member 46 forms an outer oil chamber 84. A tube 85 extends axially through the cylindrical member 47, the upper end of the tube 85 projecting upwards through the plug 73 and the lower end of the tube 85 projecting downwards through the disc 82, and an annular piston 86 is slidably mounted within the annular compartment between the tube 85 and the inside surface of the cylindrical member 47. The piston 86 subdivides the annular compartment into an air chamber 87 between the piston 86 and the plug 73 and an inner oil chamber 88 between the piston 86 and the disc 82. Sealing rings 89 in the outer wall of the piston 86 and sealing rings 90 in the inner wall of the piston 86, that is the wall engaging the tube 85, prevent escape of oil from the inner oil chamber 88 into the air chamber 87.

The operation of the telescopic unit 80 is identical with that of the telescopic unit 45 already described with reference to FIGS. 3-5, the oil chambers 84, 88 and the air chamber 87 of the unit 80 corresponding to the oil chambers 72, 77 and the air chamber 76 respectively of the unit 45. In the telescopic unit 80 however the quantity of air within the air chamber 87 is constant, and the overall length of the telescopic unit 80 under a given load is adjusted by regulating the quantity of oil within the oil chambers 84, 88, the oil being supplied to or bled from the chamber 84 through the tube 85.

I claim:

1. A telescopic spring unit comprising a cylinder member having one end thereof sealed and an inner circumferential recess at the other end, a plunger member having an internal cylindrical compartment, a collar secured in said recess, an outer bearing supported within a sleeve of resilient material carried by said collar, an inner bearing mounted in the inside wall of said cylinder member, said plunger member being slidably mounted in said inner and outer bearings for axial and angular movement relative to the cylindrical member, and said plunger member co-operating with said cylinder member to provide a first liquid chamber the volume of which increases upon telescopic extension of the unit, a piston slidably mounted in said internal cylindrical compartment and sub-dividing the compartment into a second liquid chamber and a gas chamber, the plunger member being formed with metering orifices effecting communication between said first liquid chamber and said second liquid chamber, and a seal mounted in said recess in sliding engagement with the plunger member.

2. A telescopic spring unit comprising a cylinder member having one end thereof sealed, a plunger member having an internal cylindrical compartment, an inner bearing supported within said cylinder member, an outer bearing supported within a sleeve of resilient material carried by the cylinder member adjacent the open end thereof, the said plunger member being slidably mounted in said bearings for axial and angular movement relative to the cylinder member, and said plunger member co-operating with said cylinder member to provide a first liquid chamber the volume of which increases upon telescopic extension of the unit, a piston slidably mounted in said internal cylindrical compartment and subdividing the compartment into a second liquid chamber and a gas chamber, the plunger member being formed with metering orifices effecting communication between said first liquid chamber and the said second liquid chamber, and a seal disposed between the two members to prevent escape of liquid from the unit.

3. A telescopic spring unit as set forth in claim 2, wherein said inner bearing is provided with a part-spherical outer surface and the inner wall of the cylinder member is provided with a recess housing said inner bearing, the wall of the recess being complementary to the outer surface of the inner bearing, whereby the inner bearing is self-aligning.

4. A telescopic spring unit comprising a cylinder member having one end thereof sealed, a plunger member having an internal cylindrical compartment, a tubular element extending through said plunger member centrally of the cylindrical compartment, a self-centering inner bearing supported within said cylinder member, a self-centering outer bearing supported within a sleeve of resilient material carried by the cylinder member adjacent the open end thereof, the said plunger member being slidably mounted in said bearings for axial and angular movement relative to the cylinder member, and said plunger member co-operating with said cylinder member to provide a first liquid chamber the volume of which increases upon telescopic extension of the unit, an annular piston slidably mounted on the tubular element within said cylindrical compartment and subdividing the compartment into a second liquid chamber and a gas chamber, the plunger member being formed with metering orifices effecting communication between said first liquid chamber and said second liquid chamber, the said tubular element serving for the supply of liquid to the first liquid chamber, and a seal disposed between the two members to prevent escape of liquid from the unit.

5. A telescopic spring unit comprising a cylinder member having one end thereof sealed, the inside wall of said cylinder member having an outer recess adjacent the open end of the cylinder member and an inner recess spaced from said outer recess, a collar secured in said outer recess, an outer bearing supported within a sleeve of resilient material carried by said collar, an inner bearing mounted in said inner recess, said inner bearing having a part-spherical outer surface co-operating with a part-spherical wall of the inner recess, a plunger member having an internal cylindrical compartment, a tubular element extending through the plunger member centrally of the cylindrical compartment, the said plunger member being slidably mounted in said outer and inner bearings for axial and angular movement relative to the cylinder member, and said plunger member co-operating with the cylinder member to provide a first liquid chamber the volume of which increases upon telescopic extension of the unit, an annular piston slidably mounted on said tubular element within the cylindrical compartment and subdividing the compartment into a second liquid chamber and a gas chamber, the plunger member being formed with metering orifices effecting communication between said first liquid chamber and the said second liquid chamber, the said tubular element serving for the supply of liquid to the first liquid chamber, and a seal mounted in said outer recess in sliding engagement with the plunger member.

6. In an automobile vehicle, a front wheel suspension system comprising a swing axle pivotally mounted on the frame of the vehicle, a telescopic spring unit comprising a cylinder member and a plunger member, a resilient means connecting the plunger member to the frame and permitting limited pivotal movement of the plunger member relative to the frame, a ball and socket joint connecting the cylinder member to the swing axle and permitting pivotal movement of the cylinder member relative to the swing axle and angular movement of the cylinder member about its longitudinal axis, a stub axle secured to the cylinder member and carrying a front wheel of the vehicle, said cylinder member having one end thereof sealed and the plunger member having an internal cylindrical compartment, an inner bearing supported within said cylinder member an outer bearing supported within a sleeve of resilient material carried by the cylinder member adjacent the open end thereof, said plunger member being slidably mounted in said inner and outer bearings for axial and angular movement relative to the cylinder member, and said plunger member cooperating with said cylinder member to provide a first liquid chamber the volume of which increases upon telescopic extension of the unit, a piston slidably mounted in said internal cylindrical compartment and subdividing the compartment into a second liquid chamber and a gas chamber, the plunger member being formed with metering orifices effecting communication between said first liquid chamber and said second liquid chamber, and a seal disposed between the two members to prevent escape of liquid from the unit.

7. In an automobile vehicle, a front wheel suspension system as set forth in claim 6, wherein the cylinder member is formed with a circumferential recess at the open end thereof, and the telescopic unit includes a collar mounted in said recess, the collar supporting the said sleeve of resilient material, and the said seal being mounted in the recess in sliding engagement with the plunger member.

8. In an automobile vehicle, a front wheel suspension system comprising a swing axle pivotally mounted on the frame of the vehicle, a telescopic spring unit comprising a cylinder member and a plunger member, resilient means connecting the plunger member to the frame and permitting limited pivotal movement of the plunger member relative to the frame, a ball and socket joint connecting the cylinder member to the swing axle and permitting pivotal movement of the cylinder member relative to the swing axle and angular movement of the cylinder member about its longitudinal axis, a stub axle secured to the cylinder member and carrying a front wheel of the vehicle, said cylinder member having one end thereof sealed, the inside wall of the cylinder member having an outer recess adjacent the open end of the cylinder member and inner recess spaced from said outer recess, a collar secured in said outer recess, an outer bearing supported within a sleeve of resilient material carried by said collar, an inner bearing mounted in said inner recess, said inner bearing having a part-spherical outer surface cooperating with a part-spherical wall of the inner recess, said plunger member having an internal cylindrical compartment, a tubular element extending through the plunger member centrally of the cylindrical compartment, the said plunger member being slidably mounted in said outer and inner bearings for axial and angular movement relative to the cylinder member, and said plunger member cooperating with the cylinder member to provide a first liquid chamber the volume of which increases upon telescopic extension of the unit, an annular piston slidably mounted on said tubular element within the cylindrical compartment and subdividing the compartment into a second liquid chamber and a gas chamber, the plunger member being formed with metering orifices effecting communication between said first liquid chamber and the said second liquid chamber, the said tubular element serving for the supply of liquid to the first liquid chamber, and a seal mounted in said outer recess in sliding engagement with the plunger member.

References Cited in the file of this patent

UNITED STATES PATENTS

| | | |
|---|---|---|
| 1,038,054 | Wolf | Sept. 10, 1912 |
| 1,842,273 | Lancia | Jan. 19, 1932 |
| 2,146,089 | Onions | Feb. 7, 1939 |
| 2,624,592 | MacPherson | Jan. 6, 1953 |
| 2,780,477 | Schjolin | Feb. 5, 1957 |
| 2,812,954 | Lyon | Nov. 12, 1957 |
| 2,851,314 | Thomson | Sept. 9, 1958 |

FOREIGN PATENTS

| | | |
|---|---|---|
| 502,705 | Great Britain | Mar. 23, 1939 |